(12) United States Patent
Gawade et al.

(10) Patent No.: US 10,513,225 B2
(45) Date of Patent: Dec. 24, 2019

(54) MOTOR VEHICLE WITH HEIGHT ADJUSTABLE FLOOR

(71) Applicant: GM GLOBAL TECHNOLOGY OPERATIONS LLC, Detroit, MI (US)

(72) Inventors: Tushar R. Gawade, Dhule (IN); Scott D. Thomas, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 15/895,042

(22) Filed: Feb. 13, 2018

(65) Prior Publication Data
US 2019/0248293 A1    Aug. 15, 2019

(51) Int. Cl.
*B60R 5/04* (2006.01)
*B62D 43/10* (2006.01)

(52) U.S. Cl.
CPC ............... *B60R 5/04* (2013.01); *B62D 43/10* (2013.01)

(58) Field of Classification Search
CPC ........ B65G 67/20; B65G 49/085; B64C 1/20; B60R 5/04; B64D 9/003; B64D 9/00; B60P 1/52; B60P 1/02; B66F 7/08; B25H 1/04
See application file for complete search history.

(56) References Cited

U.S. PATENT DOCUMENTS

| | | | | |
|---|---|---|---|---|
| 5,011,208 A * | 4/1991 | Lewallen | ................ | B60R 5/047 296/37.16 |
| 6,050,202 A * | 4/2000 | Thompson | ............ | B60N 3/001 108/144.11 |
| 6,644,710 B2 * | 11/2003 | Seel | .......................... | B60R 7/02 224/497 |
| 6,843,518 B2 * | 1/2005 | Schlecht | ............... | B60N 2/3011 280/749 |
| 7,188,843 B2 * | 3/2007 | Magness | ................... | B25H 5/00 280/30 |
| 7,188,881 B1 * | 3/2007 | Sturt | ....................... | B60R 5/041 296/26.09 |
| 7,300,088 B1 * | 11/2007 | Catenacci | ............ | B60N 2/3047 296/37.14 |
| 7,661,742 B2 * | 2/2010 | Medlar | ..................... | B60R 5/04 296/37.14 |
| 7,762,601 B2 * | 7/2010 | Shea | ................... | B60H 1/00592 296/37.16 |

(Continued)

FOREIGN PATENT DOCUMENTS

DE    20121023779    6/2014

*Primary Examiner* — Kiran B Patel (57) ABSTRACT

A motor vehicle, including: a loading floor; a height adjusting device with a guide on which the loading floor is pivotably mounted and movable in a substantially vertical direction and can be mounted in at least two height positions; one or more tiered support elements for supporting the loading floor in the at least two height positions; where the guide includes a first guideway for moving the floor towards the top of the guide and a second guideway for moving the floor towards the bottom of the guide; where the first guideway is configured such that exerting a backward longitudinal pulling force on the loading floor results in movement of the loading floor from a lower height position to an upper height position; and a set of corresponding features positioned beneath the loading floor for providing physical support and stability in the at least two height positions.

17 Claims, 11 Drawing Sheets

(56) References Cited

U.S. PATENT DOCUMENTS

| | | | | |
|---|---|---|---|---|
| 7,878,568 B2* | 2/2011 | Wu | | B60R 9/00 224/405 |
| 7,938,471 B2* | 5/2011 | Karaki | | B60R 5/04 224/542 |
| 7,950,712 B2* | 5/2011 | Karaki | | B60R 5/04 224/542 |
| 8,256,819 B1* | 9/2012 | Gregory | | B60R 9/065 296/37.6 |
| 8,276,964 B2* | 10/2012 | Werner | | B60N 3/105 224/926 |
| 8,469,152 B2* | 6/2013 | Olsen | | B66F 7/065 187/211 |
| 8,474,894 B2* | 7/2013 | Gerhardt | | B60P 7/14 296/24.43 |
| 8,528,957 B2* | 9/2013 | Ugalde | | B60R 5/04 280/782 |
| 8,534,736 B1* | 9/2013 | Whalen | | B60R 5/045 296/37.14 |
| 8,585,128 B2* | 11/2013 | Hoshino | | B60K 1/04 296/187.05 |
| 8,622,158 B2* | 1/2014 | Leonard | | B60D 1/00 180/7.1 |
| 8,794,694 B2* | 8/2014 | Parsons | | F41H 7/042 296/193.07 |
| 9,090,210 B2 | 7/2015 | Demma | | |
| 9,096,178 B1* | 8/2015 | Stanczak | | B60R 5/045 |
| 9,278,647 B2* | 3/2016 | Stanczak | | B60R 5/045 |
| 9,415,725 B2* | 8/2016 | Horst | | B60R 5/044 |
| 9,511,801 B2* | 12/2016 | Murray | | B62D 25/20 |
| 9,725,019 B2* | 8/2017 | Mather | | B60N 2/3075 |
| 9,783,116 B2* | 10/2017 | Huebner | | B60R 5/04 |
| 9,908,475 B2* | 3/2018 | Ayala Diaz | | E05B 85/10 |
| 10,160,388 B2* | 12/2018 | Hernandez Aviles | | B60R 5/044 |
| 10,173,596 B2* | 1/2019 | Ferreira Yanez | | B60R 7/02 |
| 10,202,081 B2* | 2/2019 | Krishnan | | B60R 7/02 |
| 10,286,816 B2* | 5/2019 | Murray | | B60N 2/015 |
| 10,286,848 B2* | 5/2019 | Herman | | B60R 5/045 |
| 2010/0090502 A1* | 4/2010 | Mercurio | | B60R 5/04 296/193.07 |
| 2010/0187857 A1* | 7/2010 | Fischer | | B60R 5/04 296/184.1 |
| 2014/0015271 A1* | 1/2014 | Demma | | B60R 5/045 296/24.44 |
| 2014/0070560 A1* | 3/2014 | Young | | B60R 5/04 296/37.14 |
| 2015/0283949 A1* | 10/2015 | V | | B60R 13/0268 296/24.43 |
| 2016/0288720 A1* | 10/2016 | Huebner | | B60R 5/045 |
| 2017/0259745 A1* | 9/2017 | Schaefer | | B60R 5/044 |
| 2019/0016268 A1* | 1/2019 | Wittorf | | B60R 7/02 |

* cited by examiner

CROSS-SECTION A-A

MOTOR VEHICLE WITH HEIGHT ADJUSTABLE FLOOR

INTRODUCTION

Motor vehicles generally include a load compartment within their interior for accommodating objects such as, for example, luggage. Typically, this interior load compartment is formed behind the backrests of the second row vehicle seats and is limited to the height between the interior ceiling and a loading floor. As a result, in an effort to stow large objects in the load compartment or for the convenience of reaching small objects in the load compartment, a height adjusting system has been developed to add space between the ceiling and loading floor. As such, this height adjusting system particularly includes a pair of mirrored guides located in the front of the load compartment and one or more support elements located at the compartment's rear. The guides will moreover direct the loading floor at one end onto the height adjusted ledges of the support elements at the opposite end. Thus, the loading floor is able to be mounted in at least two different height positions, to vary the vertical space in the load compartment. However, besides the ends of the loading floor, this system does not provide other physical support. Therefore, when heavy objects are placed in the load compartment, the loading floor tends to bend and bow under the weight of such objects. Accordingly, it is desirable to provide support for the loading floor of this height adjusting system to reduce the likelihood of collapse due to bending and bowing.

SUMMARY

One general aspect includes a motor vehicle, including: a loading floor; a height adjusting device for the loading floor with a guide on which a front end portion of the loading floor is pivotably mounted about a pivot axis and movable in a substantially vertical direction and the loading floor can be mounted in at least two height positions via the guide; one or more tiered support elements for supporting a rear end portion of the loading floor in the at least two height positions; where the guide includes a first guideway for moving the front end portion towards the top of the guide and a second guideway for moving the front end portion towards the bottom of the guide; where the first guideway is configured such that exerting a backward longitudinal pulling force on the loading floor results in movement of the loading floor from a lower height position to an upper height position; and at least one set of corresponding features positioned beneath the loading floor for providing physical support and stability for the loading floor in the at least two height positions.

Implementations may include one or more of the following features. The motor vehicle where the set of corresponding features are positioned beneath the substantially longitudinal center of the loading floor. The motor vehicle where, the set of corresponding features are: a dynamic plate on the underside of the loading floor, the dynamic plate moves with the loading floor from the lower height position to the upper height position; and a fixed plate attached to a surface positioned beneath the loading floor, the fixed plate remains stationary when the loading floor moves from the lower height position to the upper height position. The motor vehicle may also include where the dynamic plate and fixed plate have profiles configured to interlock and provide physical support in the at least two height positions; and where the interlocking relationship of the profiles is further configured to ensure interference free movement when the loading floor moves from the lower height position to the upper height position. The motor vehicle where: one of the dynamic plate and the fixed plate includes at least one peak having an outwardly curved geometry and, respectively, the other of the dynamic plate and the fixed plate includes at least two canals having an inwardly curved geometry; where the at least one peak can fit snugly into each of the at least two canals; and where, when the loading floor moves from the lower height position to the upper height position, a portion of the dynamic plate will pivotably separate from the fixed plate so as to reduce the likelihood of interference between the at least one peak and at least two canals during such movement. The motor vehicle where: one of the dynamic plate and the fixed plate includes at least one canal having an inwardly curved geometry and, respectively, the other of the dynamic plate and the fixed plate includes at least two peaks having an outwardly curved geometry; where the at least one canal can fit snugly into each of the at least two peaks; and where, when the loading floor moves from the lower height position to the upper height position, a portion of the dynamic plate will pivotably separate from the fixed plate so as to reduce the likelihood of interference between the at least one canal and at least two peaks during such movement. The motor vehicle where one of the fixed plate and the dynamic plate includes at least one sidewall to restrict lateral disengagement of the plates. The motor vehicle where the fixed plate is attached to a body floor of the motor vehicle. The motor vehicle where the fixed plate is attached to a tire interfacing structure configured to rest over a spare tire. The motor vehicle where: the fixed plate includes a hollow underside; the tire interfacing structure includes at least two interlocking features; where the fixed plate is positioned over the at least two interlocking features; and where the at least two interlocking features are configured to receive corresponding interlocking features such that, when the at least two interlocking features receive the corresponding interlocking features, the tire interfacing structure and fixed plate will be oriented towards a selected direction. The motor vehicle where the dynamic plate is affixed to the underside of the loading floor. The motor vehicle where the dynamic plate is releasably affixed to the underside of the loading floor. The motor vehicle where: a mounting structure is affixed to the underside of the loading floor; one of the underside of the dynamic plate and the underside of the loading floor includes an elongated recess; where the dynamic plate releasably attaches to the underside of the loading floor via the slidable interaction of the mounting structure and elongated recess. The motor vehicle where one of the dynamic plate and the fixed plate interface includes at least one horizontal flat region and, respectively, the other of the dynamic plate and the fixed plate includes at least two flat regions at different heights; where the interfacing flats can fit snugly; and where, when the loading floor moves from the lower height position to the upper height position, a portion of the dynamic plate will pivotably separate from the fixed plate so as to reduce the likelihood of interference between the interfacing flats during such movement. The motor vehicle where the dynamic plate can lock into both an upright and flat position via a set of operably located snap features. The motor vehicle where the set of corresponding features are: a dynamic plate affixed to the underside of the loading floor, the dynamic plate moves with the loading floor from the lower height position to the upper height position; and a stud erected from a body floor of the motor vehicle. The motor vehicle where the set of corresponding features comprises at least one sidewall to restrict lateral disengagement of the corresponding features. The motor vehicle where: the one or more tiered support elements include at least one first interlocking mechanism at each tier; the underside of the loading floor includes at least one second interlocking mechanism; where the first and second interlocking mechanisms interact at each of the at least two height positions to prevent longitudinal movement of the loading floor.

A motor vehicle, including: a loading floor; a height adjusting device for the loading floor with a guide on which a front end portion of the loading floor is pivotably mounted about a pivot axis and movable in a vertical direction and the loading floor can be mounted in at least two height positions via the guide; one or more tiered support elements for supporting a rear end portion of the loading floor in the at least two height positions; where the guide includes a first guideway for moving the front end portion towards the top of the guide and a second guideway for moving the front end portion towards the bottom of the guide; where the first guideway is configured such that exerting a backward longitudinal pulling force on the loading floor results in movement of the loading floor from a lower height position to an upper height position; a set of corresponding features positioned beneath the substantially longitudinal center of loading floor for providing physical support and stability for the loading floor in the at least two height positions, the set of corresponding features include: a dynamic plate affixed to the underside of the loading floor, the dynamic plate moves with the loading floor from the lower height position to the upper height position; a fixed plate affixed to a body floor of the motor vehicle, the fixed plate remains stationary when the loading floor moves from the lower height position to the upper height position; where the dynamic plate and fixed plate have interfacing profiles configured to provide physical support in the at least two height positions; and where the inverse relationship of the profiles is further configured to ensure interference free movement when the loading floor moves from the lower height position to the upper height position.

Implementations may include one or more of the following features. The motor vehicle where: one of the dynamic plate and the fixed plate includes at least one peak having an outwardly curved geometry and, respectively, the other of the dynamic plate and the fixed plate includes at least two canals having an inwardly curved geometry; where the at least one peak can fit snugly into each of the at least two canals; and where, when the loading floor moves from the lower height position to the upper height position, a portion of the dynamic plate will pivotably separate from the fixed plate so as to safeguard against interference between the at least one peak and at least two canals during such movement. The motor vehicle where: one of the fixed plate and the dynamic plate includes at least one sidewall to restrict lateral disengagement of the plates; and one of the at least one sidewall and the plates includes a tapered portion to prevent interferences with the sidewall and plates when the loading floor moves from the lower height position to the upper height position.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
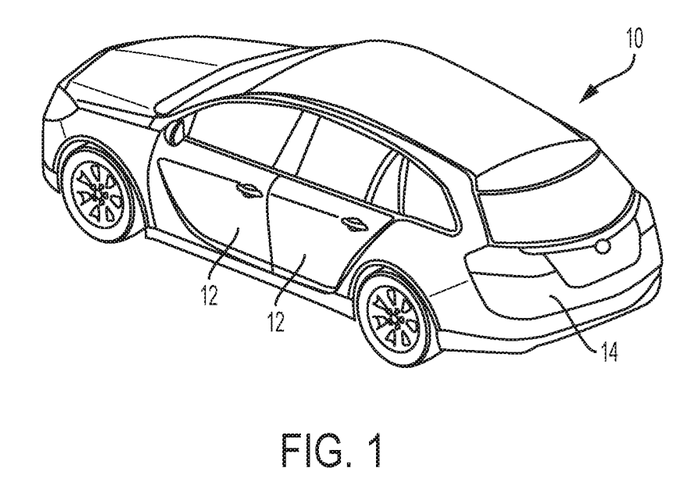
FIG. 1 is a perspective view of a motor vehicle.

As shown in FIG. 1, a motor vehicle 10 can include an internal combustion engine and/or electric motor to drive the vehicle from one location to another. Within vehicle 10, an interior space is present having front seat(s) and/or back seat(s). Two/four side doors 12 allow passengers to get in and out of this space and a tailgate door 14 allows those passengers to load and unload a load compartment.

Figure 2:
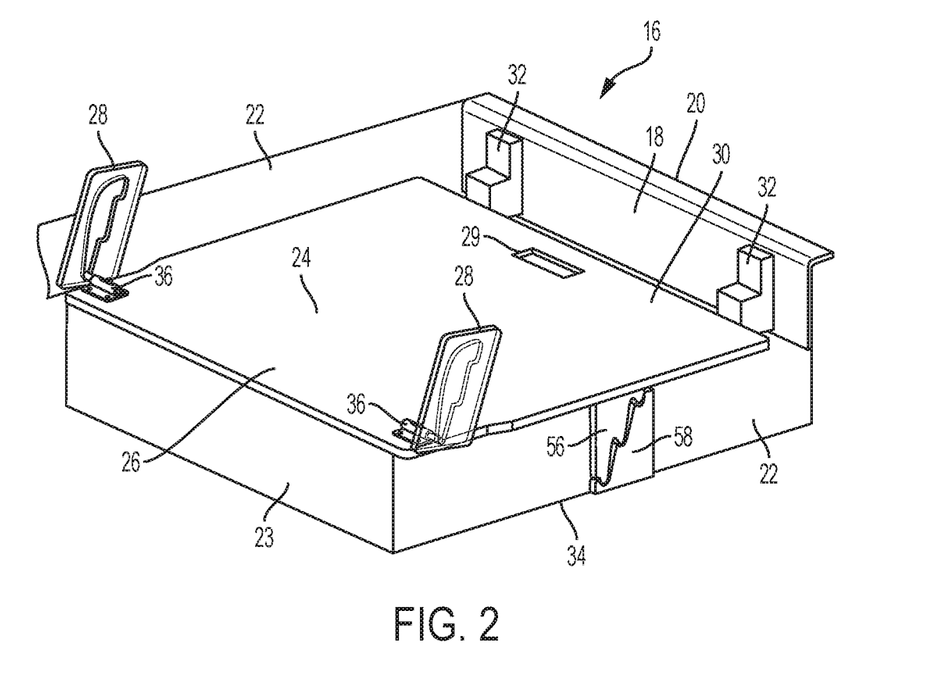
FIG. 2 is a side view of a load compartment having a height adjustable loading floor in a lower-height position.

As shown in FIG. 2, the load compartment 16 may be towards the back by a body rear wall 18 and loading edge 20. Two laterally spaced body side walls 22 also project at the periphery of rear wall 18. Conversely, towards the front, the load compartment 16 can be limited by the forward wall 23 and the backrests of the back seats (not shown).

Figure 3:
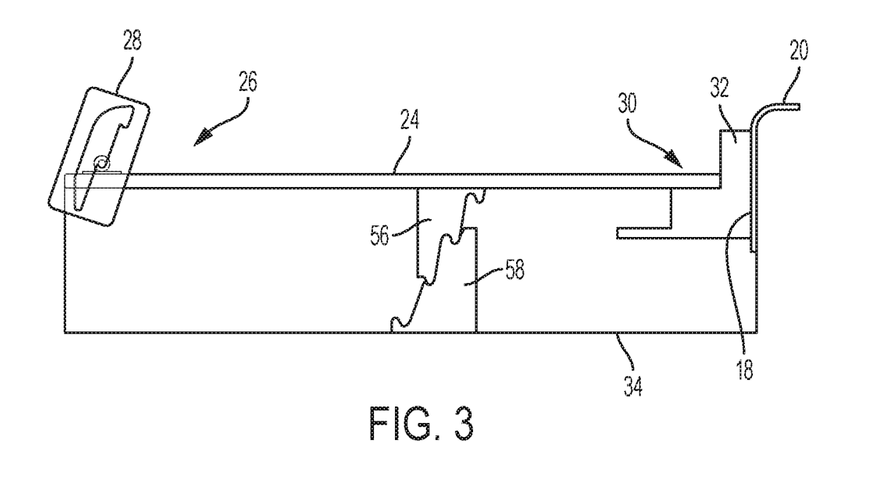
FIG. 3 is a side view of the load compartment of FIG. 2 with the height adjustable loading floor in a middle-height position.
Figure 4:
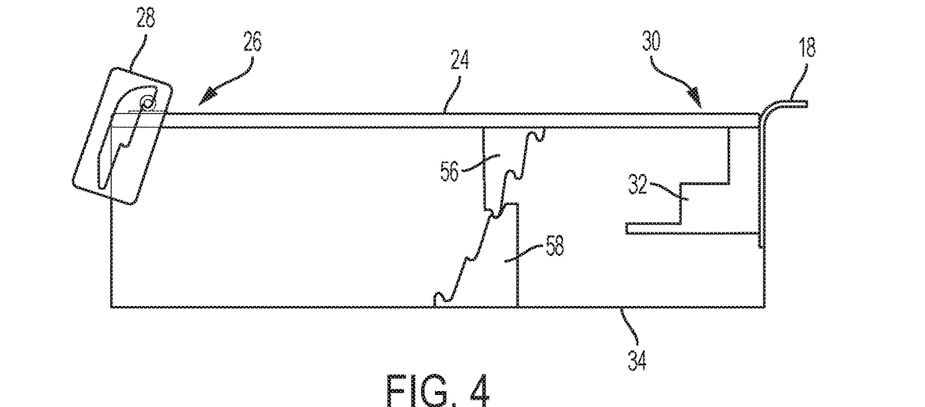
FIG. 4 is a perspective view of the load compartment of FIG. 2 with the height adjustable loading floor in an upper-height position.

Towards the bottom of load compartment 16 is a plate-shaped loading floor 24 of a substantially horizontal orientation and constructed of a rigid material such as, but not limited to, metal, plastic, or a composite. A front end portion 26 of the loading floor 24 is mounted onto a pair of guides 28 that act as height adjusting devices. The rear end portion 30 may contain a handle 29 and rests on a pair of tiered support elements 32 shown as supporting the loading floor in a lower-height position. As shown in FIG. 3, in the middle-height position, the rear end portion 30 of floor 24 rests on the middle surface of each support element 32. As shown in FIG. 4, in the upper-height position, the rear end portion 30 of floor 24 rests on the two upper surfaces of support elements 32. Below the loading floor 24, a body floor 34 is formed to allow the additional loading of goods, e.g., a spare tire, tools, and/or customer stowed items. A height adjustable set of interlocking plates 56, 58 provide support under the longitudinal center (see FIGS. 3 and 4) (i.e., at any point along a longitudinally spanning center line of floor 34) or one or both sides of loading floor 24 (see FIG. 2). It should be understood that the plate set, guides 28, and support elements 32 may include more than three tiers so that the load floor 24 may be at more than three height positions.

Figure 5A:
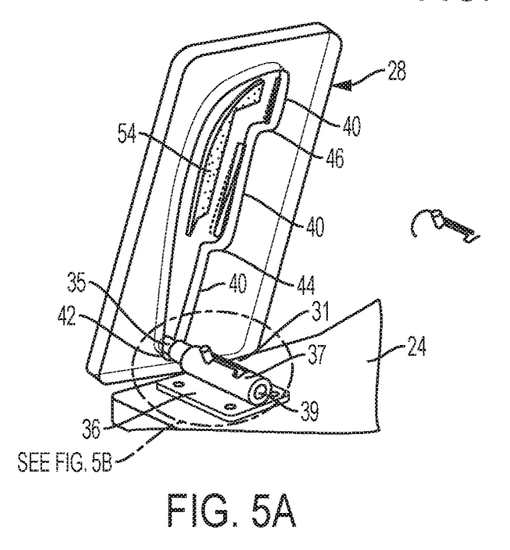
FIG. 5A is a perspective view of a guide installed in the load compartment and a fastening plate installed onto the height adjustable loading floor of FIG. 2.
Figure 5B:
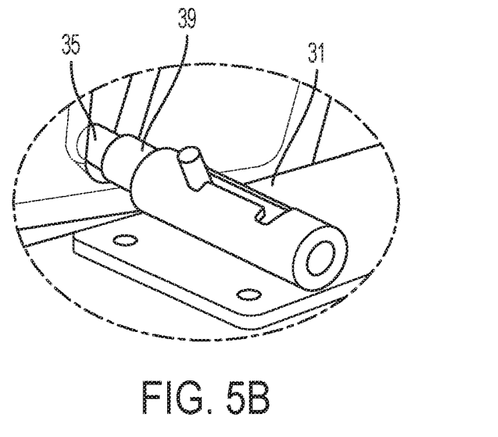
FIG. 5B is a perspective view of the laterally oriented plate of FIG. 5A.
Figure 5C:
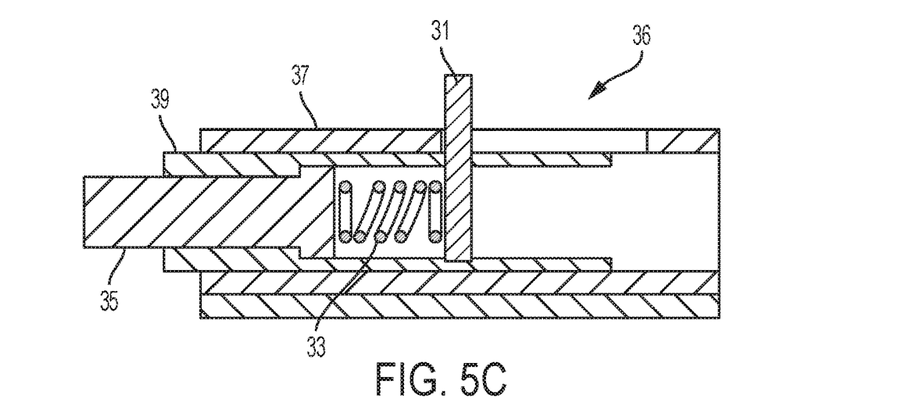
FIG. 5C is a side view cross-section of the laterally oriented plate of FIG. 5A.

As shown in FIGS. 5A through 5C, laterally oriented fastening plates 36 are located at the front end portion 26 of loading floor 24. Each fastening plate 36 includes a slide bearing socket 37 with guide bolt 39. As known of slide bearing sockets 37, a slotted track is formed along socket body to enable the guide bolt 39 to move axially within the socket 37 as well as project from the socket 37 in a transverse direction. Upon movement of the bolt 39 from the outer into the inner transverse position, the guide bolt will move in a longitudinal direction in relation to motor vehicle 10. A slotted guide nose 31 is also fastened to each guide bolt 39, so as to allow a person to move the slotted guide nose within the track and in turn move the corresponding guide bolt 39 from the outer to inner transverse position (and vice versa). While in the outer transverse position, each guide bolt 39 can be fastened to and mounted on the guide 28 (as shown). When in the inner transverse position, the two guide bolts 37 will not be mounted on the guide 28 and will allow the loading floor to be separated and removed from the motor vehicle 10 (not shown).

Figure 5D:
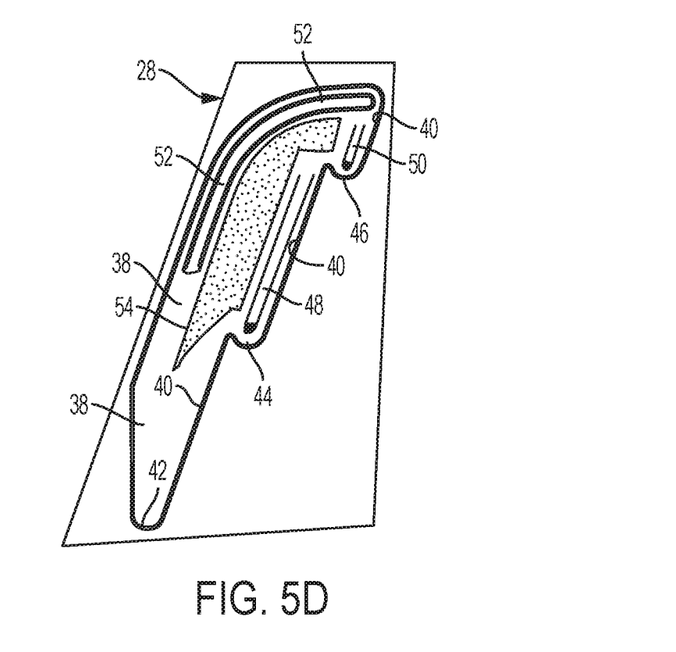
FIG. 5D is a side view of the guide of FIG. 5A.
Figure 6:
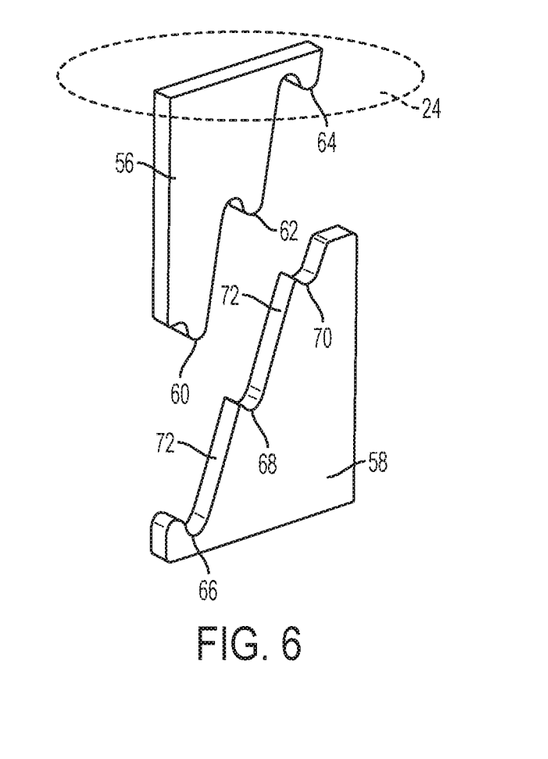
FIG. 6 is a perspective view of a set of height adjustable interlocking plates.

As shown in the FIG. 5D, the cross-section of the laterally oriented fastening plate 36 exposes the guide bolt 37 having a spring loaded plunger 35 that is pushed by a spring 33 which backs up to the slotted guide nose 31. The spring loaded plunger 35 portion of the guide bolt 37 is the feature which directly interacts with the guides 28, as shown in FIG. 5A.

Referring back to FIGS. 5A through 5C, the guides 28 are formed as a mirror image with respect to the other. A first guideway 38 acts as a groove to serve for moving the loading floor 24/spring loaded plunger 35/guide bolt 39 towards the top of the corresponding guide 28. This guideway 38 includes a rear-end slide limitation 40 formed between a lower support surface 42, a middle support surface 44, and an upper support surface 46. The rear end and flat side of slide limitation 40 may be inclined towards rear wall 18 at an angle of approximately 20° degrees relevant to a vertical plane. As such, when exerting a pulling force on the loading floor 24, towards rear wall 18, the spring loaded plunger 35/guide bolt 39 is able to slide/move automatically from the lower support surface 42 to the middle support surface 44 (in a first movement) or from the middle support surface 44 to an upper support surface 46 (in a second movement).

A lower elongated and tapered slot 48 may be located approximate to the middle support surface 44 and parallel to slide limitation 40. The lower slot 48 enables entrance of spring loaded plunger 35 of the outer traversed guide bolt 37 as the spring 33 pushes the spring loaded plunger 35 outboard in to the lower slot 48 when the plunger is positioned at the middle support surface 44. In addition, the ascending tapered shape of this lower slot 48, which is deepest near the middle support surface 44 and shallowest near the upper support surface 46, allows removal of the respective spring loaded plunger 35 of guide bolt 37 in such a way that the plunger will naturally slide out of lower slot 48 in an inboard direction while automatically sliding/moving from the middle support surface 44 to the upper support surface 48. This lower slot 48 also prevents the reverse travel of the spring loaded plunger 35 back toward the lower support surface 42, since the walls of lower slot 48 prevent the spring loaded plunger 35 from moving in this direction. In certain embodiments, the lower slot 48 may incorporate a descending tapered shape (i.e., shallowest near the middle support surface 44 and deepens towards the upper support surface 46). This tapered configuration helps guide the plungers 35/bolts 39 when moving from the upper support surface 46 to the middle support surface 44.

Similar to the lower slot 48, an upper elongated and tapered slot 50 may be located approximate to the upper support surface 46 and also parallel to slide limitation 40 (at the locations above upper support surface 46). The upper slot 50 enables entrance of the spring loaded plunger 35 of the outer traversed guide bolt 37 as the spring 33 pushes the spring loaded plunger 35 outboard in to the upper slot 50 when the plunger is positioned at the upper support surface 44. In addition, the ascending tapered shape of this upper slot 50 (i.e., deepest near the upper support surface 46 and shallows towards the top of slide limitation 40) allows removal of the respective spring loaded plunger 35 of guide bolt 37 in such a way that the bolt will naturally slide out of upper slot 50 in an inboard direction while automatically traveling from the upper support surface 46 and subsequently move into a second guideway 52 which is tapered in itself. Upper slot 50 also prevents the reverse travel of the spring loaded plunger 35 back toward the middle support surface 44 since the walls of upper slot 50 prevent the spring loaded plunger 35 from moving in this direction. The second guideway 52 moreover serves for moving the loading floor 26 towards the bottom once the spring 33 pushes the spring loaded plunger 35 outboard in to the second guideway 50 by directing the spring loaded plunger 35 along its track and with the help of gravity returns the spring loaded plunger 35 of the outer traversed guide bolt 37 to the lower support surface 35. In certain embodiments, the upper slot 50 may incorporate a descending tapered shape (i.e., shallowest near the upper support surface 46 and deepens towards the top of slide limitation 40). This tapered configuration helps guide the plungers 35/bolts 39 when moving from one end of second guideway 52 to the upper support surface 46—as discussed below.

When the loading floor 26 is in the lower-height position (see FIG. 2), the spring loaded plungers 35/guide bolts 39 rest on the lower support surface 42. When moving the loading floor 24 from this lower-height position into a middle-height position (see FIG. 3), a backward and longitudinal pulling force is exerted such as via handle 29 on the rear end portion 30 to help the spring loaded plungers 35/guide bolts 39 to move along slide limitation 40 and towards the middle support surface 44. To assist in exerting such longitudinal force, loading floor 24 can be pivoted about a pivot axis 45 (FIG. 10) that is established by the spring loaded plungers 35/guide bolts 39 and moved towards the top of guides 28. After the guide bolts 39 are made to rest on the middle support surface 44, the floor 24 can again be pivoted into a horizontal orientation. In addition, this movement can be repeated to cause the floor 24 to move into an upper-height position (FIG. 4). The floor 24/plungers 35/bolts 39 can also move from the lower support surface 42 to upper support surface 46 in one operation. Moreover, to assist in moving the floor 24 from the lower support surface 42 to upper support surface 46, a guide stop 54 serves to direct the bolts 39 to one or both support surfaces.

To move the loading floor 24 from the upper-height position (FIG. 4) to lower-height position (FIG. 2), loading floor 24 should be pivoted about spring loaded plungers 35/guide bolts 39, so that the front-end portion 26 can be moved towards the top of first guideway 38 at which point in time the spring loaded plungers 35 of the guide bolts 39 will engage the second guideway 52 when pushed outboard into the guideway 52 by the spring 33. At the top, a backward and substantially longitudinal force can be exerted on the floor 24 to cause the spring loaded guides 35 of the guide bolts 39 to move along the second guideway 52 and to automatically direct the plungers 35/bolts 39 downwards by gravitational force. Due to geometry, the spring loaded plungers 35/guide bolts 39 will fall in such a way they are directed onto the lower support surface 42 upon leaving the second guideway 52.

Skilled artisans will also see that in embodiments not including the lower and upper slots 48, 50 or those having the lower and upper slots 48, 50 incorporating a descending tapered shape 48, 50, it is possible to move the plungers 35/bolts 39 from the upper support surface 46 to the middle support surface 44 by first asserting a forward longitudinal force and allowing guide stop 54 to direct the bolts 39 to gravitationally fall onto the middle support surface 44. Analogously, this movement can also be repeated to drop the guide bolts 39 from the middle support surface 44 to lower support surface 42. As should be understood, the descending tapered shape of the lower and upper slots 48, 50 will moreover allow removal of the respective spring loaded plunger 35 of guide bolt 37 in such a way that the bolt will naturally slide out of lower/upper slot 48, 50 in an inboard direction while gravitationally falling onto the middle support surface 44/lower support surface 42.

As shown in FIGS. 6 through 10, the set of contoured support plates (i.e., corresponding features), dynamic step plate 56 and fixed step plate 58, are situated beneath loading floor 24 in an erected configuration for physical support. As such, these contoured plates 56, 58 work in conjunction to be height adjustable to provide such physical support and stability for loading floor 24 when in any of the three height positions (lower, middle, or upper) as well as to prevent the floor 24 from bending/bowing while in any one of these positions. As can be seen, fixed step plate 58 may be attached to a surface of the motor vehicle 10 such as the body floor 34 and thus remain stationary. Whereas, the dynamic step plate 56 is attached to the underside of the loading floor 24 and will change locations in accordance with the movement of floor 24 from one height position to another. Moreover, these plates 56, 58 have corresponding three-tiered profiles of an inverse relationship so as to interlock at each height location and also provide interference-free movement when floor 24 is traveling from one height position to another.

Figure 7:
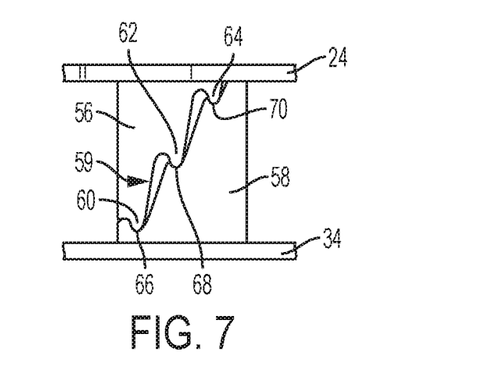
FIG. 7 is a side view of the interlocking plates of FIG. 6 in the lower-height position.
Figure 8:
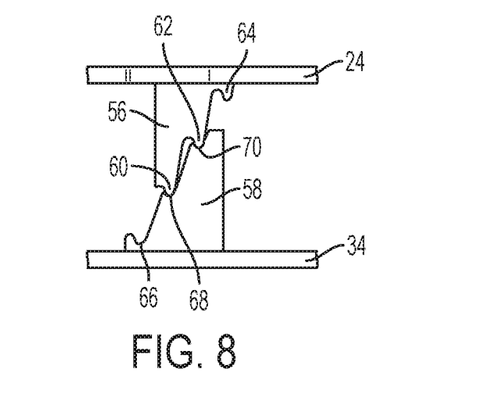
FIG. 8 is a side view of the interlocking plates of FIG. 6 in the middle-height position.
Figure 9:
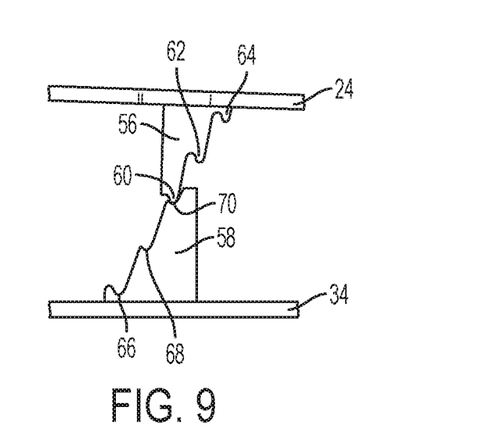
FIG. 9 is a side view of the interlocking plates of FIG. 6 in the upper-height position.

The dynamic plate 56 includes a lower peak 60 (oriented closer to the front end portion 26), middle peak 62 and an upper peak 64 (oriented closer to the rear end portion 30), each of an outwardly curved geometry. Conversely, the fixed plate 58 includes a lower canal 66 (situated closer to the front end portion 26), middle canal 68, and an upper canal 70 (situated closer to the rear end portion 30), each of an inwardly curved geometry. As a result, the peaked surface 60 can fit into the inversely curved geometry of each canal 66, 68, and 70. The peaked surface 62 can fit in to the inversely curved geometry of canals 68 and 70, and the peaked surface 64 can fit into the canal 70. Therefore, when floor 24 is in the lower-height position the lower peak 60 will fit snugly into the lower canal 66, the middle peak 62 will fit snugly into the middle canal 68, and the upper peak 64 will fit snugly into the upper canal 70 (FIG. 7). However, portions of the plates 56, 58 interposed between the peaks and canals do not meet as shown by reference number 59. Additionally, when floor 24 is in the middle-height position the lower peak 60 will be fit snugly into the middle canal 68, the middle peak 62 will be fit snugly into the upper canal 70 and the upper peak will be elevated above and situated freely from fixed plate 58 (FIG. 8). When floor 24 is in the upper-height position, the lower peak 60 will be fit snugly into the upper canal 70 while the other two peaks 62, 64 will be elevated above and situated freely from fixed plate 58 (FIG. 9). The snug fit between one or more peaks and one or more canals ensures load floor 24 will remain stable and not shift in a longitudinal/horizontal direction while at one of the height positions.

Figure 10:
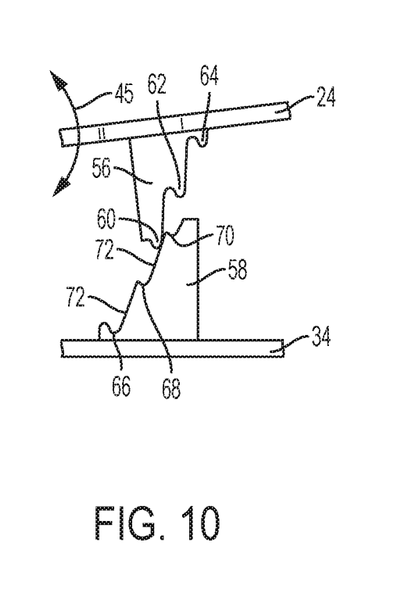
FIG. 10 is a side view of the interlocking plates of FIG. 6 moving from the lower height position to the upper height position.

As floor 24 travels from one height position to another and is pivoted about its pivot axis, the dynamic plate 56 will also be pivoted via pivot axis 45 and separated (i.e., pivotably separated) in a way that causes the middle peak 62 and upper peak 64 to be spaced away from the fixed plate 58 (i.e., rotated away to create physical space) to safeguard against interference during such movement (i.e., generally reducing the likelihood of blockage, as shown in FIG. 10). Thus, only lower peak 60 should move along a slide wall 72 formed between the canals 66, 68, and 70. To ensure lower 60 peak moves along the slide wall 72 effectively, the slide wall 72 may be at an angle of approximately 20° relevant to a vertical plane and leaning towards rear wall 18.

Figure 11A:
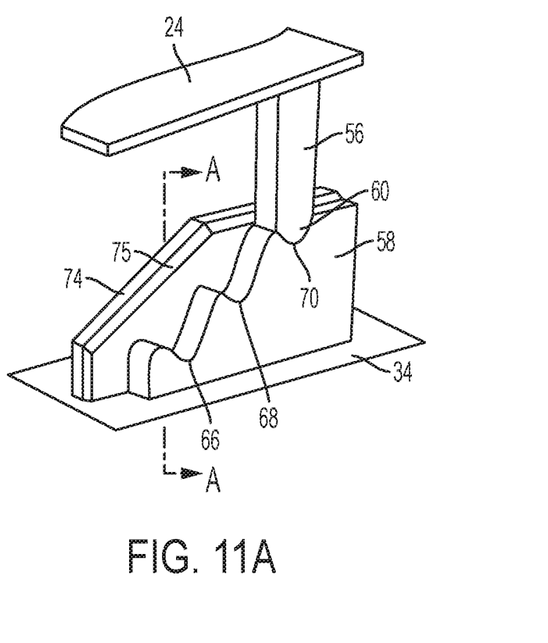
FIG. 11A is a perspective view of another embodiment of the interlocking plates.
Figure 11B:
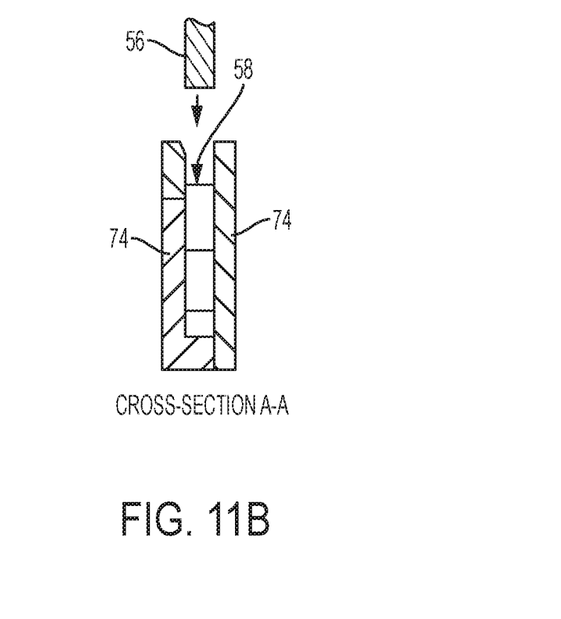
FIG. 11B is a front facing view of one of the interlocking plates of FIG. 11A.
Figure 11C:
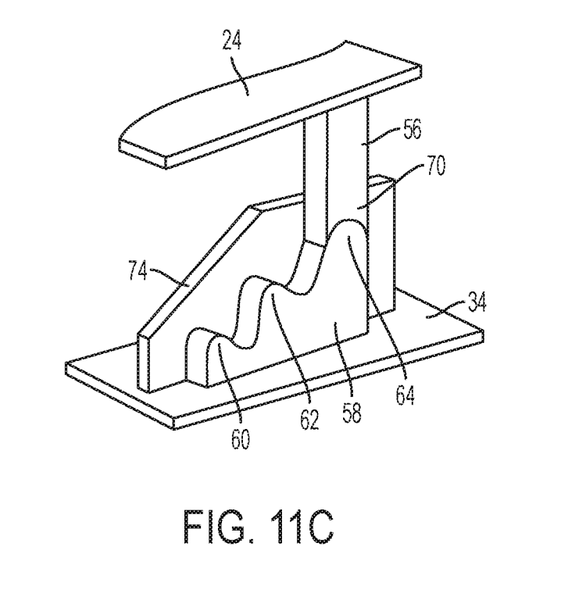
FIG. 11C is a perspective view of another embodiment of the interlocking plates.
Figure 11D:
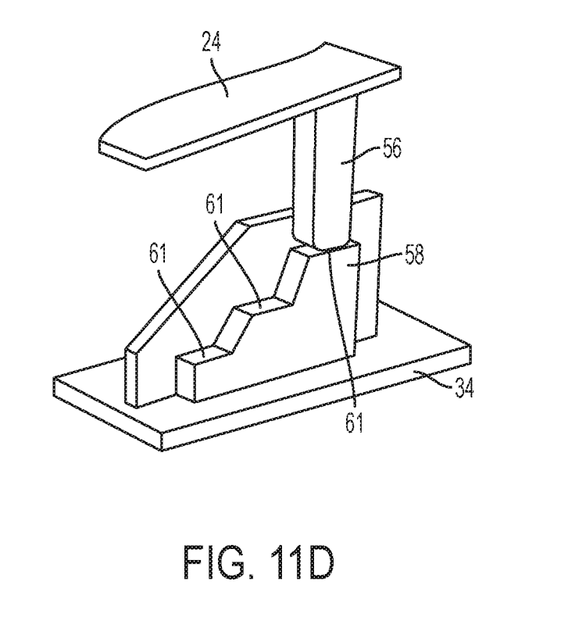
FIG. 11D is a perspective view of another embodiment of the interlocking plates.

As shown in FIGS. 11A and 11B, lateral sidewalls 74 may be molded to fixed plate 58 to restrict lateral disengagement of dynamic plate 56 from fixed plate 58, for example, when the floor 24 is traveling from one height position to another and/or when floor 24 is carrying heavy loads. Each sidewall 74 may also have a tapered sidewall surface 75 and/or a tapered lead edge 77 to prevent interferences with the movement of dynamic plate 56 as the loading floor 24 travels from one height position to another. As can be seen, in this embodiment, dynamic plate 56 may be elongated and only incorporate a single peak at its tip (i.e., the lower peak 60) to be fit snugly into each canal 66, 68, and 70. It should be understood that only one sidewall 72 may alternatively be molded to fixed plate 58. Skilled artisans will envision alternative embodiments in which the lower peak 60 includes tapered side wall surfaces and/or a tapered lead edge to prevent interferences with the movement of dynamic plate 56 as the loading floor 24 travels from one height position to another. Skilled artisans will also see that these features can be configured such that the sidewalls, canals, and peaks are reversed with the opposite features on the fixed plate 58 and the dynamic plate 56 (i.e., the canals being located on dynamic plate 56 and peaks being located on fixed plate 58). For example, as shown in FIG. 11C, and embodiment of the plates can incorporate one or more canals being located on dynamic plate 56. As shown, in this embodiment, dynamic plate 56 may be elongated and include a single canal at its tip (i.e., the lower canal 70) which can be fit snugly onto each peak 66, 68, and 70. Furthermore, skilled artisans can envision alternative embodiments of these plates and their corresponding interactions. For example, as shown in FIG. 11D, it is possible to include horizontal flat surfaces 61 as the interfaces between the dynamic plate 56 and the fixed plate 58.

Figure 12:
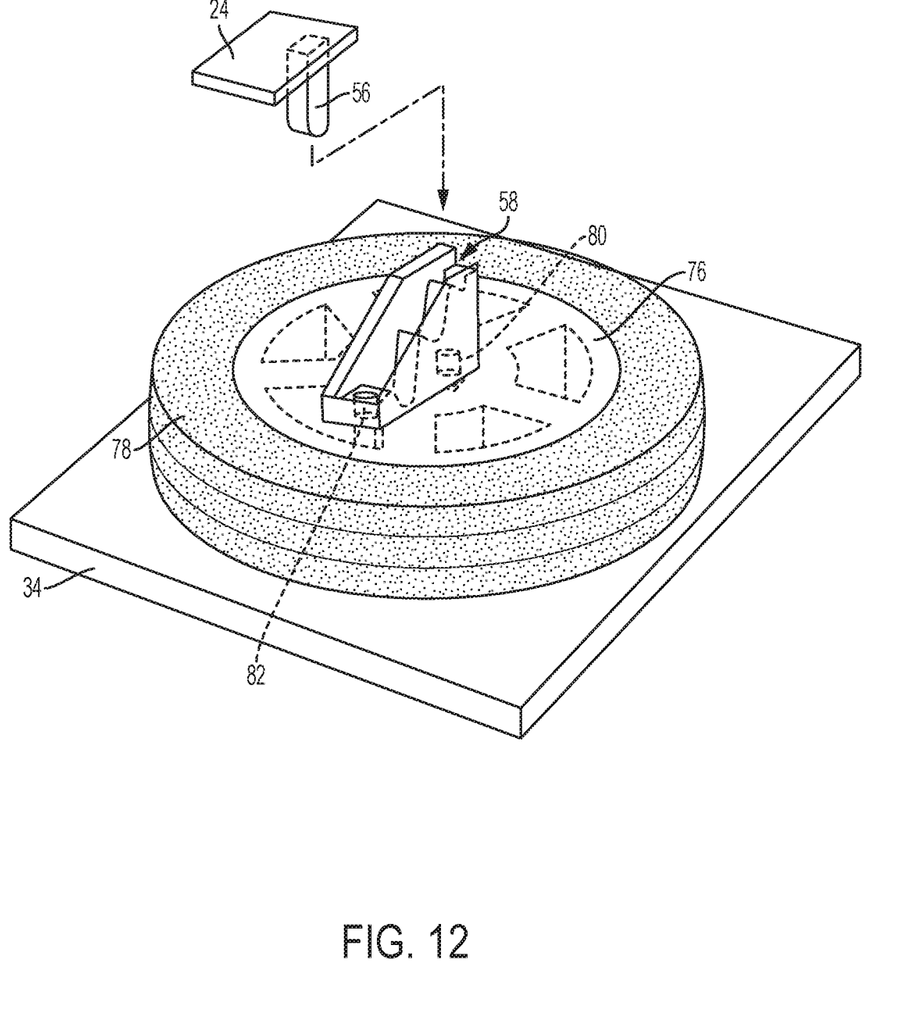
FIG. 12 is a perspective view of another embodiment of the interlocking plates.

As shown in FIG. 12, the fixed plate 58 may be mounted to a tire interfacing structure 76 such as, for example, a covering surface that rests over the spare tire 78 on body floor 34 or directly on the spare tire 78 well structure. In this embodiment, fixed plate 58 may have a hollow underside and interfacing structure 76 may include two orifices 80, 82. Orifice 80 may receive the stud which is used in conjunction with a wing nut and washer to mount spare tire 78 to body floor 34. Orifice 82 may receive a positioning stud (not shown) which is installed onto body floor 34 and can be used to orient interfacing structure 76 and fixed plate 58 towards a selected direction. Thus, when interfacing structure 76 and fixed plate 58 are positioned over both studs, these features are forced to face in a certain direction.

Figure 13A:
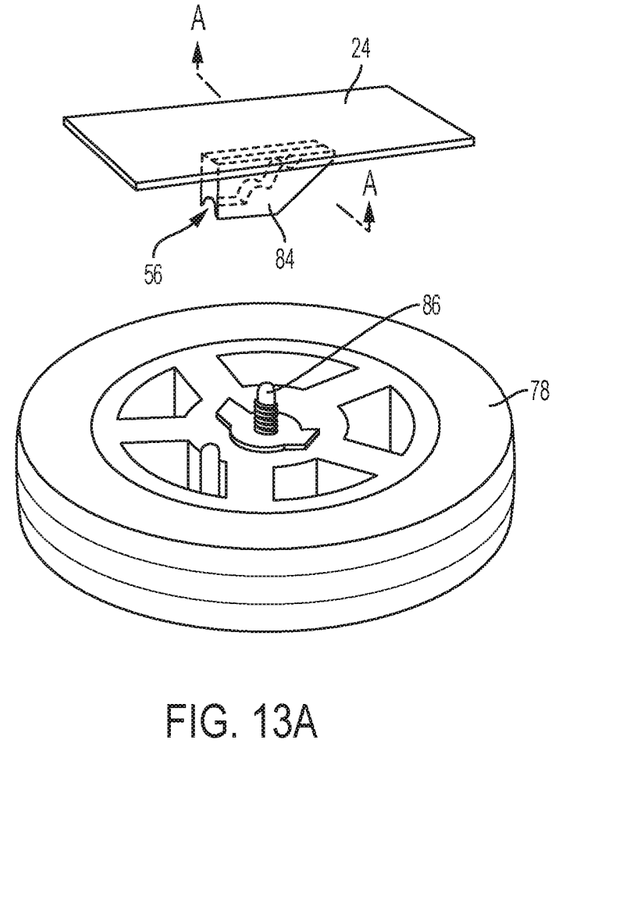
FIG. 13A is a perspective view of another embodiment of the interlocking plates.
Figure 13B:
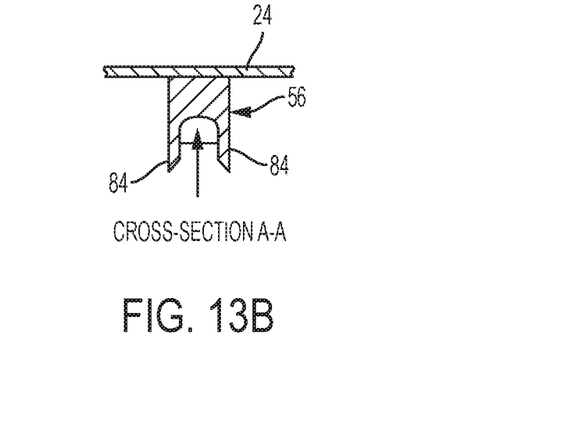
FIG. 13B is a front facing view of one of the interlocking plates of FIG. 13A.

As shown in FIGS. 13A and 13B, dynamic plate 56 may incorporate two sidewalls 84 as well as rounded canals (e.g., a lower canal, middle canal, and upper canal), each similar to those discussed in previous embodiments of fixed plate 58. In this embodiment, moreover, the end portion of tire mount stud 86 will slide into and interlock with each canal so as to prop up dynamic plate 56 and floor 24. As a result, tire mount stud 86, erected from body floor 34, replaces the need for an independent fixed plate 56.

Figure 14:
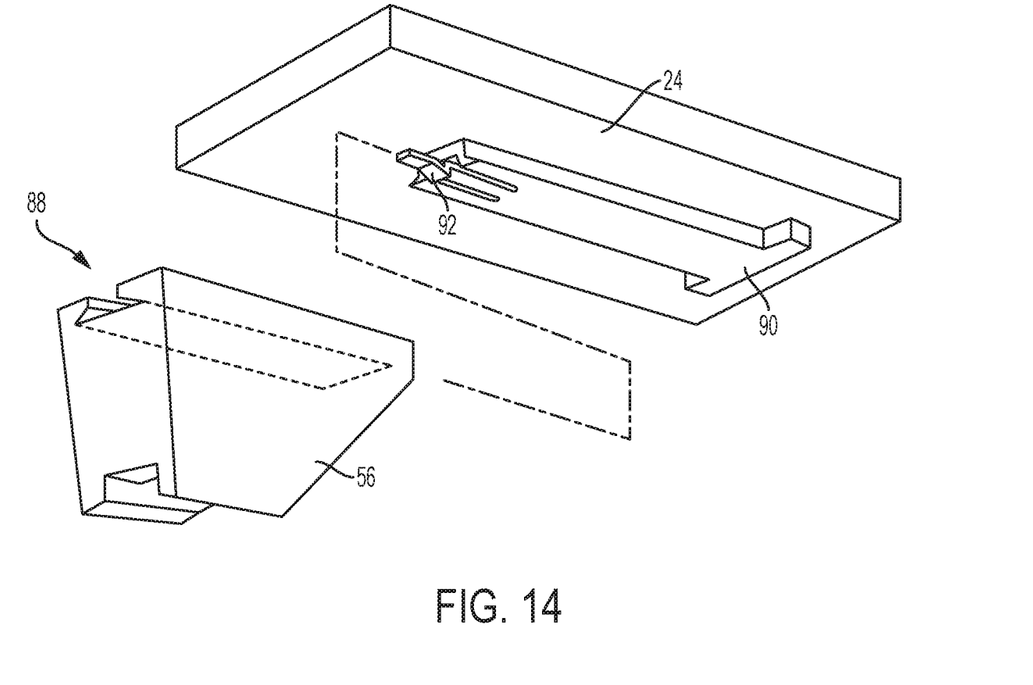
FIG. 14 is a perspective view of another embodiment of the interlocking plates.
Figure 15:
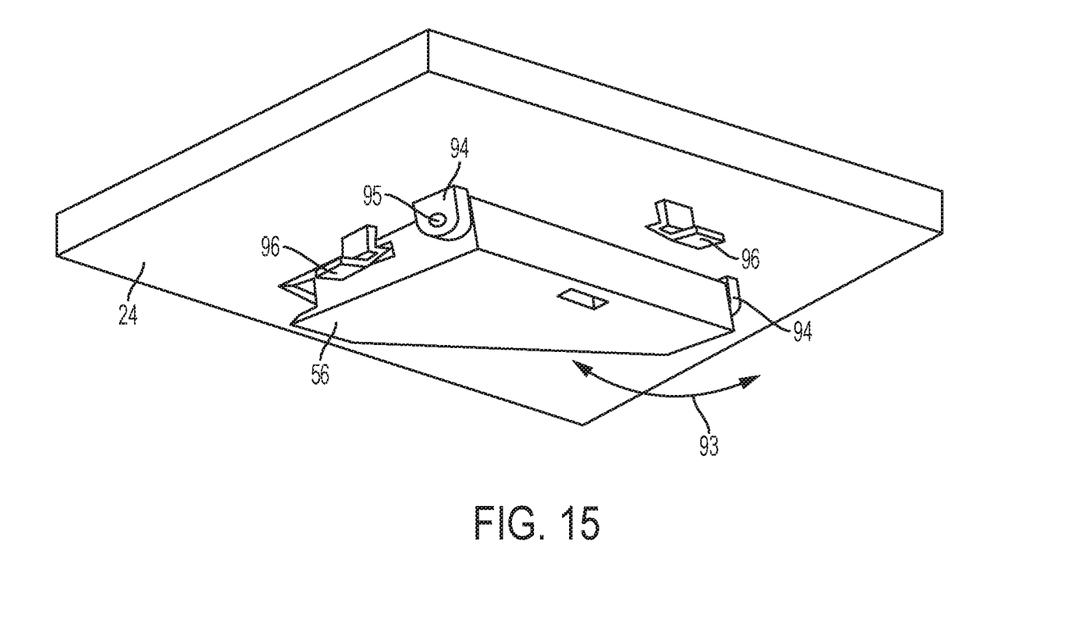
FIG. 15 is a perspective view of another embodiment of the interlocking plates.

As shown in FIG. 14, an embodiment of dynamic plate 56 may removably mount to the underside of floor 24. As such, an elongated recess 88, which runs lengthwise along the underside of dynamic plate 56, may slide directly onto a mounting structure 90 and lock into place via a snap feature such as, but not limited to, snap clip 92. In this embodiment, mechanical fasteners such as, but not limited to, wing nuts may also be used to removably mount dynamic plate 56 to floor 24. As shown in FIG. 15, an embodiment of dynamic plate 56 may pivotably mount into place on the underside of floor 24. As such, dynamic plate 56 may move in a pivotable manner 93 around a pivot point created by the combination of an axle 95 through the dynamic plate and a pair of axle mounts 94. The dynamic plate 56 may also lock into an upright position and a flat position via a set of operably located snap features such as, but not limited to, spring lock clips 96. The removably mounted and pivotably mounted embodiments of dynamic plate 56 can facilitate convenient storage of floor 24 when removed from load compartment 16. Skilled artisans will envision as an additional alternative the removable mounted and pivotally mounted plate being the fixed plate 58 (as opposed to dynamic plate 56). In this manner, it should be understood that a larger storage space may be present when the floor 24 is removed from the load compartment.

Figure 16A:
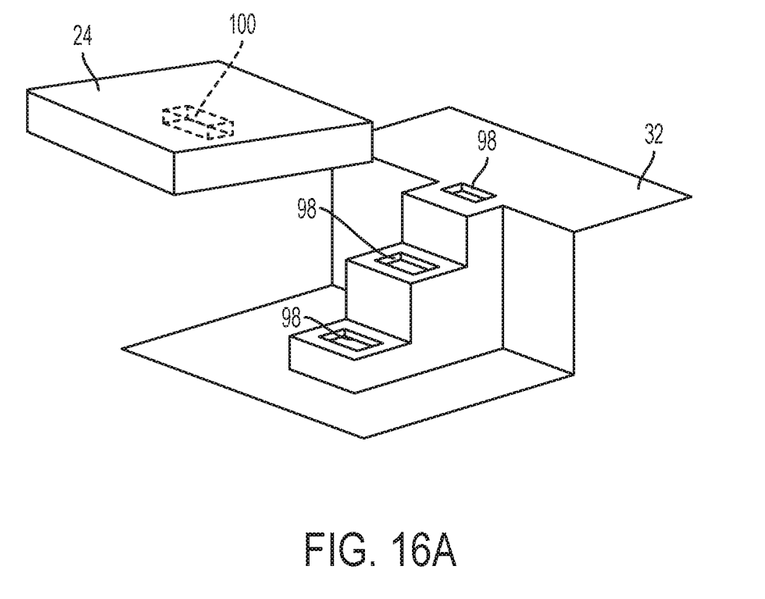
FIG. 16A is a perspective view of another embodiment of a tiered support element and the loading floor and FIG. 16B is a perspective view of another embodiment of a tiered support element and the loading floor.
Figure 16B:
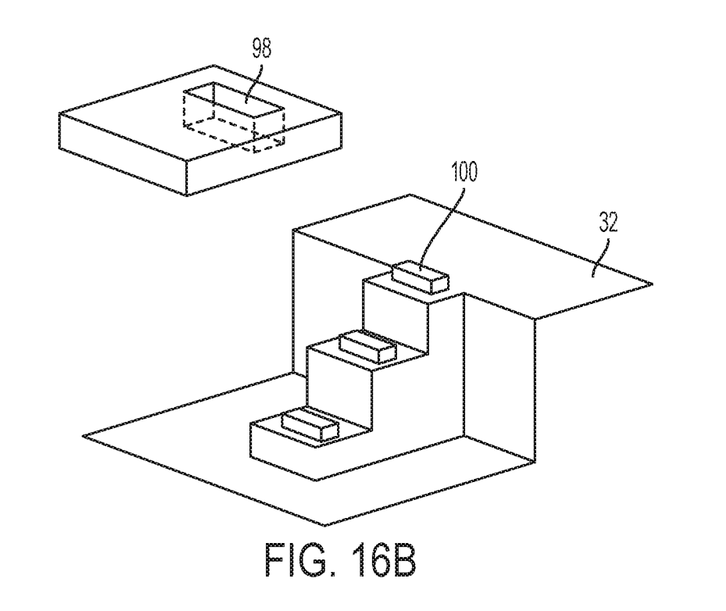

As shown in FIG. 16A, each tier of the support elements 32 may include at least one indent such as, but not limited to, rectangular indent 98 (i.e., a female feature) which interlocks with a peg such as, but not limited to, a rectangular peg 100 (i.e., male feature) located on the underside of the rear end portion 30 of the loading floor 24. Thus, interlocking indent 98 and peg 100 facilitates stability and restricts longitudinal and lateral movement of floor 24 at any one of the three height positions. As shown in FIG. 16B, each tier of the support elements 32 may alternatively include a peg such as, but not limited to, a rectangular peg 100 (i.e., male feature) which interlocks with an indent such as, but not limited to, a rectangular indent 98 (i.e., male feature) located on the underside of the rear end portion 30 of the loading floor 24, to facilitate stability and restrict longitudinal movement of floor 24 at any one of the three height positions. The rectangular peg 100 and the rectangular indent 98 may have tapered surfaces (not shown). Skilled artisans will also envision one or more indents 98 and one or more pegs 100 being incorporated onto configurations of the dynamic plate 56 and fixed plate 58 for interlocking purposes. The interlocking relationship of the indents 98 and pegs 100 facilitates stability and restricts longitudinal and lateral movement of floor 24 at any one of the three height positions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A motor vehicle, comprising:
   a loading floor;
   a height adjusting device for the loading floor with a guide on which a front end portion of the loading floor is pivotably mounted about a pivot axis and movable in a substantially vertical direction and the loading floor can be mounted in at least two height positions via the guide;
   one or more tiered support elements for supporting a rear end portion of the loading floor in the at least two height positions;
   wherein the guide comprises a first guideway for moving the front end portion towards the top of the guide and a second guideway for moving the front end portion towards the bottom of the guide;
   wherein the first guideway is configured such that exerting a backward longitudinal pulling force on the loading floor results in movement of the loading floor from a lower height position to an upper height position; and
   at least one set of corresponding features positioned beneath the loading floor for providing physical support and stability for the loading floor in the at least two height positions.

2. The motor vehicle of claim 1, wherein the set of corresponding features are positioned beneath the substantially longitudinal center of the loading floor.

3. The motor vehicle of claim 1, wherein:
   the set of corresponding features are:
      a dynamic plate on the underside of the loading floor, the dynamic plate moves with the loading floor from the lower height position to the upper height position; and
      a fixed plate attached to a surface positioned beneath the loading floor, the fixed plate remains stationary when the loading floor moves from the lower height position to the upper height position;
   wherein the dynamic plate and fixed plate have profiles configured to interlock and provide physical support in the at least two height positions; and
   wherein the interlocking relationship of the profiles is further configured to ensure interference free movement when the loading floor moves from the lower height position to the upper height position.

4. The motor vehicle of claim 3, wherein:
   one of the dynamic plate and the fixed plate comprises at least one peak having an outwardly curved geometry and, respectively, the other of the dynamic plate and the fixed plate comprises at least two canals having an inwardly curved geometry;
   wherein the at least one peak can fit snugly into each of the at least two canals; and
   wherein, when the loading floor moves from the lower height position to the upper height position, a portion of the dynamic plate will pivotably separate from the fixed plate so as to reduce the likelihood of interference between the at least one peak and at least two canals during such movement.

5. The motor vehicle of claim 3, wherein:
   one of the dynamic plate and the fixed plate comprises at least one canal having an inwardly curved geometry and, respectively, the other of the dynamic plate and the fixed plate comprises at least two peaks having an outwardly curved geometry;
   wherein the at least one canal can fit snugly into each of the at least two peaks; and wherein, when the loading floor moves from the lower height position to the upper height position, a portion of the dynamic plate will pivotably separate from the fixed plate so as to reduce the likelihood of interference between the at least one canal and at least two peaks during such movement.

6. The motor vehicle of claim 3, wherein one of the fixed plate and the dynamic plate comprises at least one sidewall to restrict lateral disengagement of the plates.

7. The motor vehicle of claim 3, wherein the fixed plate is attached to a body floor of the motor vehicle.

8. The motor vehicle of claim 3, wherein the fixed plate is attached to a tire interfacing structure configured to rest over a spare tire.

9. The motor vehicle of claim 8, wherein:
   the fixed plate includes a hollow underside;
   the tire interfacing structure comprises at least two interlocking features;
   wherein the fixed plate is positioned over the at least two interlocking features; and
   wherein the at least two interlocking features are configured to receive corresponding interlocking features such that, when the at least two interlocking features receive the corresponding interlocking features, the tire interfacing structure and fixed plate will be oriented towards a selected direction.

10. The motor vehicle of claim 3, wherein the dynamic plate is affixed to the underside of the loading floor.

11. The motor vehicle of claim 3, wherein the dynamic plate is releasably affixed to the underside of the loading floor.

12. The motor vehicle of claim 3, wherein:
   a mounting structure is affixed to the underside of the loading floor;
   one of the underside of the dynamic plate and the underside of the loading floor comprises an elongated recess; and
   wherein the dynamic plate releasably attaches to the underside of the loading floor via the slidable interaction of the mounting structure and elongated recess.

13. The motor vehicle of claim 3 wherein:
   one of the dynamic plate and the fixed plate interface comprises at least one horizontal flat region and, respectively, the other of the dynamic plate and the fixed plate comprises at least two flat regions at different heights;
   wherein the interfacing flats can fit snugly; and
   wherein, when the loading floor moves from the lower height position to the upper height position, a portion of the dynamic plate will pivotably separate from the fixed plate so as to reduce the likelihood of interference between the interfacing flats during such movement.

14. The motor vehicle of claim 13, wherein the dynamic plate can lock into both an upright and flat position via a set of operably located snap features.

15. The motor vehicle of claim 1, wherein:
   the set of corresponding features are:

a dynamic plate affixed to the underside of the loading floor, the dynamic plate moves with the loading floor from the lower height position to the upper height position; and a stud erected from a body floor of the motor vehicle.

16. The motor vehicle of claim 1, wherein the set of corresponding features comprises at least one sidewall to restrict lateral disengagement of the corresponding features.

17. The motor vehicle of claim 1, wherein:
the one or more tiered support elements comprise at least one first interlocking mechanism at each tier;
the underside of the loading floor comprises at least one second interlocking mechanism; and
wherein the first and second interlocking mechanisms interact at each of the at least two height positions to prevent longitudinal movement of the loading floor.

* * * * *